Jan. 30, 1962     R. H. HALLIWELL     3,018,633
METHOD FOR CHARGING FLUOROCARBON GASES
Filed March 21, 1960
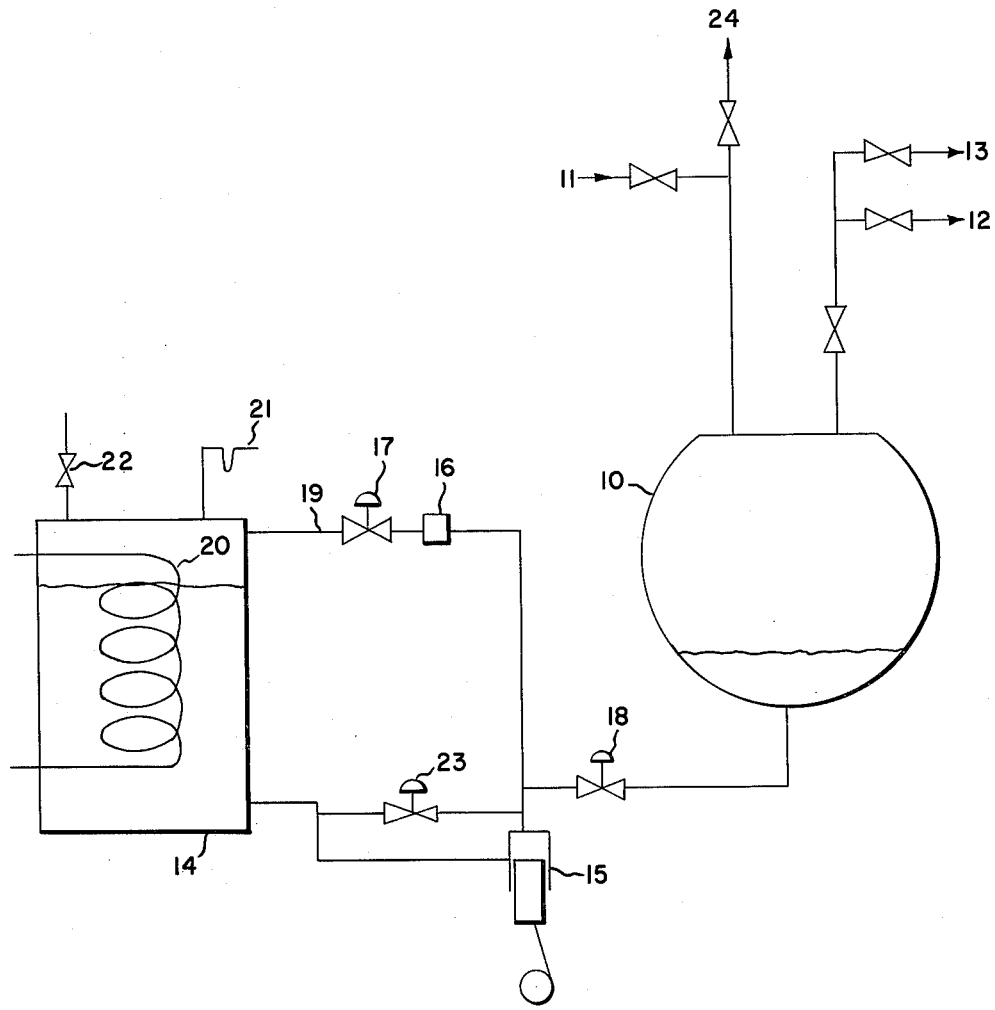
INVENTOR
RONALD HARRY HALLIWELL
BY *Bernd W. Sandt*
ATTORNEY tion to provide a safe, reliable and simple method for the transfer of normally gaseous, unsaturated, fluorinated hydrocarbons. It is another object of the present invention to provide a method for the transfer of fluorinated monomers through displacement by an immiscible liquid. Other objects will become apparent hereinafter.

3,018,633
METHOD FOR CHARGING FLUOROCARBON GASES

Ronald Harry Halliwell, Parkersburg, W. Va., assignor to E. I. du Pont de Nemours and Company, Wilmington, Del., a corporation of Delaware
Filed Mar. 21, 1960, Ser. No. 16,524
6 Claims. (Cl. 62—48)

The present invention relates to a method of transferring fluorocarbon gases, and, more particularly, to a method for charging and pumping liquefied, reactive fluorinated hydrocarbon gases.

Low molecular weight, unsaturated fluorinated hydrocarbon gases, such as tetrafluoroethylene and vinylidene fluoride, are extremely reactive gases at normal and elevated temperatures, which in the presence of even traces of free radicals, tend to spontaneously polymerize in an exothermic reaction and which, if not properly controlled, may cause dangerous explosions. Although it is possible, by the addition of stabilizers, to prevent the spontaneous polymerization of these fluorinated monomers, it is at times necessary and desirable to transfer unstabilized compounds of this type. This is particularly true when charging the fluorinated monomer to a polymerization vessel in which it is to be polymerized. When charging a fluorinated monomer to a polymerization vessel, it is generally essential that the monomer be supplied at constant pressure even though the rate of polymerization, and, therefore, the consumption of the monomer may vary. Various means have been developed to accomplish this purpose. Thus, the reactive monomer has been charged in the liquid phase to the polymerization vessel by controlled pumping. This method of charging, however, has the disadvantage of requiring a pump, the use of which has invariably resulted in the formation of some polymer through spontaneous polymerization, even though the low temperature required to maintain the monomer in the liquid phase lowers the reactivity of the monomer. Such spontaneously formed polymer causes the lines and pump to clog, thus necessitating time-consuming and expensive cleaning operations and repairs. In another method, the polymerization vessel is continuously charged with gaseous monomer which is vaporized from a liquid reservoir. However, this method is potentially hazardous and not completely satisfactory, since it requires heating of the liquid monomer to a temperature at which the vapor pressure of the monomer corresponds to the desired polymerization pressure. The necessary temperatures are frequently sufficiently high that spontaneous polymerization on a large scale can occur. As indicated above, such spontaneous polymerization is extremely hazardous and can lead to explosions.

It is, therefore, one of the objects of the present invention to provide a safe, reliable and simple method for the transfer of normally gaseous, unsaturated, fluorinated hydrocarbons. It is another object of the present invention to provide a method for the transfer of fluorinated monomers through displacement by an immiscible liquid. Other objects will become apparent hereinafter.

The objects of the present invention are accomplished by a process which comprises displacing the normally gaseous, unsaturated, fluorinated hydrocarbon in the liquid phase by an aqueous solution of a zinc halide wherein the halogen has an atomic number of 17 to 53 inclusive, said aqueous solution having a density of greater than the density of the liquefied fluorinated hydrocarbon, and a freezing point of lower than the temperature at which the fluorinated hydrocarbon is maintained in the liquid phase. In the displacement of the liquid fluorinated hydrocarbon with an aqueous solution of zinc chloride, bromide, or iodide, the major disadvantages and hazards of methods heretofore employed are avoided. Thus, since the displacement method of the present invention does not require the pumping of the liquid reactive fluorinated hydrocarbon, clogging of lines and pumps through spontaneous polymer formation is avoided. The hazards and limitations of the gas transfer method, wherein liquid reactive fluorocarbon compounds are warmed so as to be vaporized and thereby transferred are similarly avoided.

The choice of a salt which will form a solution suitable as a displacement medium is critical. Thus, not only must the solution meet the physical requirements of a satisfactory displacement liquid, such as density greater than that of the liquid fluorinated monomer transferred, i.e., sufficient solubility of the salt at the transfer temperature to result in the required density; a freezing point lower than that of the boiling point of the liquid fluorinated monomer transferred at the required density; immiscibility with the liquid fluorinated monomer to be transferred; and extremely low vapor pressure at the transfer temperature; but such a displacement liquid must also be chemically inert towards the fluorinated monomer transferred. Thus, the salts used must neither promote polymerization of the fluorinated monomer, nor react with the monomer. They must not cause any significant absorption of the fluorinated monomer. The salt employed should be substantially insoluble in the fluorinated monomer and any vapor that is transferred into the fluorinated monomer phase should be inert in the subsequent polymerization of the monomer. A further prerequisite in the selection of a suitable salt for the formation of a displacement liquid is the ability of the solution, having the required density and being at the transfer temperature, to be pumped without precipitation or crystallization of the salt. In accordance with the process of the present invention, it was discovered that zinc halides, wherein the halogen has an atomic number of 17 to 53, inclusive, meet all the foregoing requirements and form suitable displacement solutions.

Although the process of the present invention is suitable for the displacement pumping of any terminally unsaturated fluorinated hydrocarbon which can spontaneously react with free radicals, such as vinyl fluoride, vinylidene fluoride and perfluorobutadiene, the process of the invention finds its greatest utility in the transfer of tetrafluoroethylene.

In the displacement transfer of tetrafluoroethylene, it is desirable to employ a displacement liquid which has a density of at least 1.5 g./cm.$^3$, flows readily at temperatures as low as $-78°$ C. and does not crystallize under these conditions. Employing the zinc halides, it was discovered that aqueous solutions of said zinc halides containing 40% to 65% of zinc halide are well suited for the transfer of tetrafluoroethylene at temperatures from $-10$ to $-70°$ C. The preferred zinc halide is zinc chloride.

The invention is further illustrated by reference to the attached drawing where the process is schematically shown. Liquid tetrafluoroethylene by means of gravity or otherwise is charged into the monomer tank 10 from line 11. In order to provide the necessary hydrostatic head pressure to fill the tank, the tank is vented to either a gas holder or a condenser where evaporating tetrafluoroethylene is liquefied. Once the tank is filled and it is desired to transfer the tetrafluoroethylene stored in tank 10 to, for example, a polymerization vessel, the displacement liquid stored in tank 14 is pumped by means of a pump 15 into the tetrafluoroethylene tank 10. As a result, tetrafluoroethylene is transferred through line 24 into the reaction vessel where it vaporizes, and builds up in pressure until the desired pressure is reached.

Pressure regulator 16 controlling valves 17 and 18 allows continuous transfer of the tetrafluoroethylene to the polymerization vessel at the desired pressure by either pumping the displacement liquid into tank 10 or recirculating it through line 19. On completion of the transfer, the pump is turned off and the higher pressure of the remaining monomer in the hold-up tank 10 forces the displacement liquid back into the displacement liquid tank 14 through valve 23 by-passing the pump. The remaining monomer in the tank 10 is then vented to the gas holder 12 or condenser 13. The cycle is then repeated. The displacement liquid tank is equipped with cooling coils 20 to cool the displacement liquid to the temperature necessary for maintaining tetrafluoroethylene in the liquid state at the prevalent pressures. The displacement tank is also equipped with an atmospheric seal 21 and a vent to a gas chamber 22. Many refinements of this schematically illustrated process will occur to those skilled in the art. Thus, for example, it may be advisable to install flow regulators which will prevent the complete displacement of the solution from the monomer tank. Other level regulators can also be installed in the hold-up tank for the displacement liquid.

Using the equipment illustrated, liquid tetrafluoroethylene at a temperature of $-30°$ C. having a density of 1.33 g./cm.$^3$, was transferred by pressure into a three foot four inch jacketed stainless steel sphere, maintained at $-30°$ C. by a brine solution. Into the hold-up tank was charged 800 lbs. of a 51% zinc chloride solution. The pump was started and the zinc chloride solution was pumped into the tetrafluoroethylene tank causing the tetrafluoroethylene to be pressured above the desired polymerization pressure and to be transferred to the polymerization vessel, where due to the higher temperatures the tetrafluoroethylene vaporized until the desired polymerization pressures of 200 to 600 p.s.i.g. had built up. At the desired pressure, the pressure regulator in the displacement system caused the zinc chloride solution to be recirculated to the hold-up tank. As the monomer was polymerized, additional displacement liquid was pumped into the monomer tank thereby maintaining the desired pressure in the polymerization vessel. At the end of the polymerization, the pump was turned off and the pressure of the remaining monomer in the hold-up tank forced the zinc chloride solution back into the storage tank through the pump by-pass. This was continued until the displacement liquid had reached a sufficiently low level for additional charging of the monomer tank.

The zinc chloride solution employed as the displacement liquid was found to have a density of 1.64 g./cm.$^3$ at $-30°$ C. The solution had a viscosity of 80 centipoises at $-30°$ C. and could easily be handled in simple pumping equipment. Even at temperatures as low as $-78°$ C., the zinc chloride solution could be pumped and precipitation or crystallization of the zinc chloride did not occur. Liquid tetrafluoroethylene in contact with the zinc chloride solution at temperatures of $-30$ to $-35°$ C. was analyzed and found to contain less than 20 parts per million of water and less than 0.01 part per million of zinc. Solubility of the tetrafluoroethylene in zinc chloride under these conditions was found to be less than 50 parts per million of tetrafluoroethylene. No evidence of chemical reaction of the tetrafluoroethylene with zinc chloride was noted and it was determined that zinc chloride did not initiate the polymerization of tetrafluoroethylene. No change in the polymerization rate of tetrafluoroethylene and in the molecular weight of the resulting polymer was found to result from the mixing of the tetrafluoroethylene and the zinc chloride, even at room temperature over long periods. It was determined that the combination of tetrafluoroethylene and zinc chloride solution in the monomer hold-up tank did not affect the properties of polymer formed from such tetrafluoroethylene. Similar results are obtained with zinc bromide and zinc iodide.

I claim:

1. A method for transferring unsaturated fluorinated hydrocarbons, which comprises displacing said fluorinated hydrocarbon in liquid form, with an aqueous solution of a zinc halide, wherein the halogen has an atomic number of 17 to 53 inclusive, said aqueous solution having a density greater and a freezing point lower than the density and temperature of the fluorinated hydrocarbon when transferred.

2. A method for transferring tetrafluoroethylene which comprises displacing liquid tetrafluoroethylene at a temperature of $-10$ to $-70°$ C. with an aqueous solution of a zinc halide, wherein the halogen has an atomic number of 17 to 53 inclusive, said aqueous solution having a density greater and a freezing point lower than the density and temperature of the tetrafluoroethylene when transferred.

3. The method set forth in claim 2 wherein the zinc halide is zinc chloride.

4. The method set forth in claim 3 wherein the zinc chloride is employed in a concentration of 45 to 60% by weight of aqueous medium.

5. A method for transferring tetrafluoroethylene which comprises displacing liquid tetrafluoroethylene at a temperature of $-25$ to $-35°$ C. with an aqueous solution of zinc halide having a density of greater than 1.5 g./cm.$^3$.

6. The method set forth in claim 5 wherein the zinc halide is zinc chloride.

References Cited in the file of this patent

UNITED STATES PATENTS

| | | |
|---|---|---|
| 2,459,227 | Kerr | Jan. 18, 1949 |
| 2,828,862 | Johnson | Apr. 1, 1958 |